Figure 2:
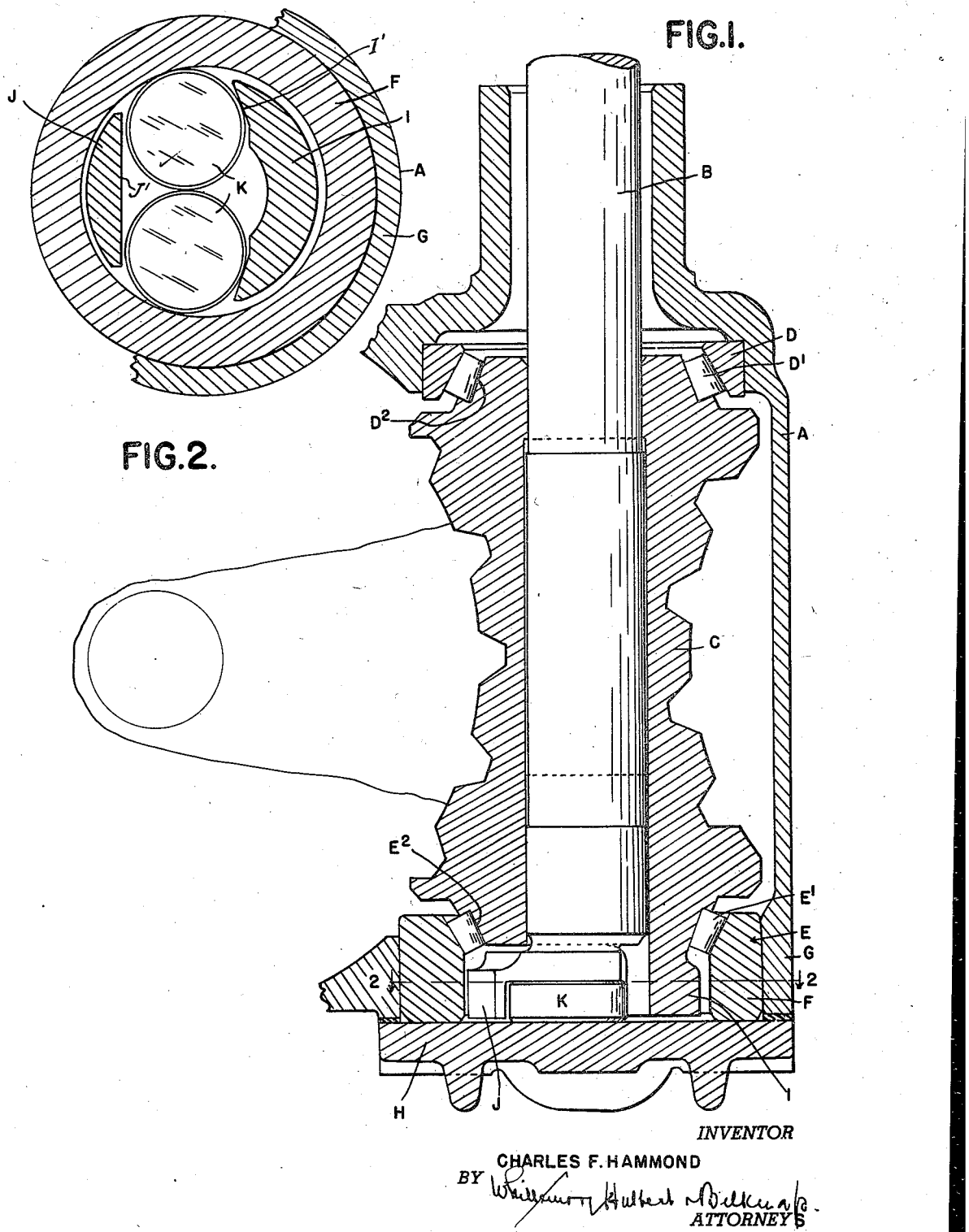

May 26, 1942.  C. F. HAMMOND  2,284,201
VEHICLE STEERING GEAR
Filed May 8, 1941

FIG.I.

INVENTOR
CHARLES F. HAMMOND
BY
ATTORNEYS

Patented May 26, 1942

2,284,201

UNITED STATES PATENT OFFICE 2,284,201

VEHICLE STEERING GEAR

Charles F. Hammond, Grosse Pointe, Mich., assignor to Gemmer Manufacturing Company, Detroit, Mich., a corporation of Michigan Application May 8, 1941, Serial No. 392,562

6 Claims. (Cl. 192—7)

The invention relates to vehicle steering gears and more particularly to a construction designed for use on trucks, army cars, and other heavy motor vehicles.

It is the object of the invention to obtain a construction which, while not wholly irreversible, will, nevertheless, absorb road shocks and prevent the transmission of the same to the hand wheel under control of the driver. To this end, the invention consists in the construction as hereinafter set forth.

In the drawing:

Fig. 1 is a vertical central section through a steering gear of my improved construction; and Fig. 2 is a cross section on line 2—2 of Fig. 1.

In the present state of the art, motor vehicle steering gears are usually in some degree reversible, so that in cooperation with the ground wheels there will be a tendency to return to a straight line after the turning of the vehicle. For lightweight vehicles such as the ordinary automobile, this reversibility is not objectionable, but with heavy vehicles, road shocks may be sufficient to produce an objectionable reaction in the hand-controlled wheel. To overcome this difficulty, I have devised a construction of gearing including a shock arrester, which is arranged between the steering stem and the gears operated thereby. A further feature of this construction is that this shock arrester permits rotation of the stem by the gearing under normal loads, thereby permitting automatic straightening after turning.

As illustrated, A is the casing enclosing the gearing between the steering stem or column B and the wheel-turning mechanism. C is a worm of the hour-glass type, sleeved upon the steering stem B and mounted in roller bearings arranged at opposite ends thereof in the casing A. These bearings are adapted to take both radial and end thrust, so as to hold the worm in mesh with a cooperating worm gear (not shown). The roller bearing for the upper end of the worm includes a conical race member D and tapering rolls D', which latter engage a conical race member D² at the end of the worm. At the lower end of the worm there is a conical race member E for tapering rollers E' engaging a conical race member E² on the worm. The race member E is preferably integral with an annular member F having cylindrical inner and outer surfaces and of sufficient thickness to possess a considerable degree of rigidity. This member fits within a cylindrical portion G of the casing A and is held against rotation preferably by forming a press fit therein. There is also a cap or closure member H for the lower end of the casing.

As usually constructed, the worm is keyed or splined to the stem so as to be directly rotated by the latter. In my improved construction, the worm is rotatably free from the stem, but is coupled thereto by the following construction. I is a segmental extension of the lower end of the worm, which is arranged within the space enclosed by the annular member F. J is a segmental extension of the steering stem, which is offset from the axis of the latter and extends within the annular member F adjacent to, but out of contact with, the inner surface thereof. Between the members I and J is a pair of rolls K which are arranged with their centers offset from the plane of the axis of the stem and worm on the side toward the member J. These rolls are also of a diameter such as to contact with each other and with the inner cylindrical surface of the member F when close to, but not in actual contact with, the surface J' of the member J. The member I extends into close proximity to these rolls and is fashioned to contact therewith at a predetermined point I' in the circumference thereof. The arrangement is such that the rotation of the stem B will cause the member J to transmit torque through the rolls K to the member I, thereby rotating the worm with the stem. Also, the rotation of the worm will, through the member I transmit torque through the rolls K to the member J, to thereby rotate the stem. This constitutes a reversible transmission.

It will be noted that the force transmitted from the member J to one or the other of the rolls K (according to the direction of rotation) tends to move this roll away from contact with the surface of the annular member F. On the other hand, force transmitted from the member I to the rolls K tends to move these rolls toward the inner surface of the member F into closer contact therewith. However, the position of the point of contact between the member I and the roll K determines whether or not this contact is within or without the angle of friction. If it is without the angle of friction, then rotary movement will be transmitted from the worm to the steering stem through the member I, rolls K, and member J. On the other hand, if it is within the angle of friction, then the rolls K will wedge into locking engagement with the surface of the member F, thereby preventing rotation around the axis of the worm, As has been stated, it is the object of the invention to obtain a reversible construction, but nevertheless one which under road shocks will lock and prevent transmission of rotary movement from the worm to the stem. This I accomplish by so arranging the points of contact between the member I and the rolls K as to cause a normal reaction between the latter and the member F which is approximately at, but very slightly outside, the angle of friction. This will permit the transmission of movement from the worm to the stem when actuated by a force no greater than that resulting from the returning of the ground wheels to a straight forward position. If, however, there is a much greater force or sudden shock produced by road conditions, the inertial resistance and possibly slight distortion of the parts will be sufficient to change the reaction to be within the angle of friction, so that the rolls K will wedge and lock.

It will be understood that the angle of friction is influenced by various factors such as the amount of clearance between the parts, the character of the contacting surfaces, and as to whether or not these surfaces are lubricated. In commercial manufacture, it is difficult to hold dimensions within close tolerances, and I therefore find it advisable to employ a lubricant of sufficient viscosity to compensate for slight inaccuracies in workmanship. Thus, under normal conditions, there will be a lubricant film between the surfaces of the parts so that the reaction will be outside of the angle of friction. On the other hand, a sudden shock or excessive pressure will break through this lubricant film, throwing the reaction within the angle of friction and effectively locking the parts against movement.

To guard against the breaking of the structure under exceptionally heavy stresses, the friction between the member F and said casing is limited to permit turning before breakage will occur.

While the rolls do not revolve about their own axes during the operation of the device, there is, nevertheless, a slight creeping action which has the effect of changing the points of contact and distributing the wear.

What I claim as my invention is:

1. In a steering gear, the combination with a steering stem and a member to be actuated thereby, of torque transmission means intermediate said stem and member normally operable by the latter with a reaction close to but slightly without the angle of friction, and means responsive to abnormal stresses or road shocks applied to said member for shifting said reaction in the torque transmitting means to be within the angle of friction and thereby effecting a locking action.

2. In a steering gear, the combination with a steering stem and a member to be actuated thereby, of a gearing intermediate said stem and member including a worm sleeved upon said stem to be concentric therewith but rotatively free therefrom, an annular race member in axial alignment with said stem and worm, projections from said stem and worm within said annular race member on opposite sides of the center thereof, and rolls between said projections and in contact with said race member and each other being adapted to reversibly transmit torque between said stem and worm, said rolls being positioned to have when driven in either direction a normal reaction against said race member which is outside of the angle of friction but which is responsive to abnormal stresses or road shocks transmitted to said actuated member to shift said reaction within the angle of friction.

3. In a steering gear, the combination with a steering stem, of a gearing including a worm sleeved upon said stem, a housing enclosing said gearing, an annular member non-rotatively secured within said housing adjacent to one end of said worm and stem and provided with a cylindrical inner surface concentric with the axis thereof, segments respectively on said stem and worm projecting into said annular member spaced on opposite sides of the axis thereof and in the plane of said cylindrical surface, and a pair of rolls forming torque transmitting means between said segments, said rolls contacting with each other and with said cylindrical surface on one side of the axis of the latter, said segments having surfaces at selected angles to each other for contact with said rolls and such that the pressure of the stem segment against either of said rolls will produce a reaction therein against said cylindrical surface which is outside the angle of friction while the pressure of said worm segment will develop a reaction with said cylindrical surface that is close to the angle of friction being outside thereof under normal pressures and being shifted inside by abnormal road shocks.

4. In a steering gear, the combination with a steering stem and a member to be actuated thereby, of a reversible gearing intermediate said stem and member including a worm sleeved upon said stem but rotatively free therefrom, a housing enclosing said gearing, an annular member non-rotatively secured within said housing adjacent to one end of said worm and stem and in axial alignment therewith, a pair of rolls within said annular member contacting each other and the surface of said member and with their centers in a plane laterally offset from an axial plane, segments respectively on said stem and said worm projecting within said annular member on opposite sides of said rolls, the stem segment having a surface slightly spaced from said rolls, and angular bearing surfaces on said worm segment for contacting respectively with said rolls, the angle of said surfaces being selected to cause when pressed against said rolls by a rotation of said worm in either direction a reaction between said rolls and annular member which is outside to the angle of friction under moderate stress and is within the angle of friction under excessive stress.

5. In a steering gear, the combination with a steering stem and a member to be actuated thereby, of a reversible gearing intermediate said stem and member including a worm sleeved upon said stem but rotatively free therefrom, a housing enclosing said gearing, an annular member non-rotatively secured within said housing adjacent to one end of said worm and stem and in axial alignment therewith, a pair of rolls within said annular member contacting each other and the surface of said member and with their centers in a plane laterally offset from an axial plane, segments respectively on said stem and said worm projecting within said annular member on opposite sides of said rolls, the stem segment having a surface slightly spaced from said rolls, angular bearing surfaces on said worm segment for contacting respectively with said rolls, the angle of said surfaces being selected to cause when pressed against said rolls by a rotation of said worm in either direction, a reaction between said rolls and annular member which is close to the angle of friction, and a lubricant for the contacting surfaces of said rolls and annular member of sufficient viscosity to hold said reaction outside the angle of friction under moderate stresses transmitted thereto from said worm and to shift said reaction to within the angle of friction under excessive stresses or road shocks.

6. In a steering gear, the combination with a steering stem and a member to be actuated thereby, of a gearing intermediate said stem and member including a worm sleeved upon said stem to be concentric therewith but rotatively free therefrom, an annular member in axial alignment with said stem and worm, projections from said stem and worm within said annular member, means intermediate said projections for reversibly transmitting torque from one to the other with a reaction against said annular member, the angle of contact between said projections and torque transmitting means being such as to produce a normal reaction against said annular member which is outside the angle of friction but the contact of said worm projection with said torque transmitting means being responsive to abnormal stresses or road shocks transmitted to the worm to produce a reaction against said annular member which is within the angle of friction and will therefore absorb the shock.

CHARLES F. HAMMOND.